H. A. LACERDA.

LUBRICATING PACKING.

APPLICATION FILED DEC. 21, 1920

Reissued Apr. 5, 1921. 15,078.

WITNESS:

Robt. R. Kitchel.

INVENTOR

Harry A. Lacerda

BY

Frank S. Busse

ATTORNEY.

NORRIS PETERS, INC., LITHO., WASHINGTON, D. C.

UNITED STATES PATENT OFFICE.

HARRY A. LACERDA, OF JERSEY CITY, NEW JERSEY, ASSIGNOR TO RALPH W. BENSON, OF NEW YORK, N. Y.

LUBRICATING-PACKING.

15,078. Specification of Reissued Letters Patent. Reissued Apr. 5, 1921.

Original No. 1,347,388, dated July 20, 1920, Serial No. 197,068, filed October 17, 1917. Application for reissue filed December 21, 1920. Serial No. 432,369.

*To all whom it may concern:*

Be it known that I, HARRY A. LACERDA, a citizen of the United States, formerly a resident of Schenectady, New York, and now a resident of Jersey City, in the county of Hudson and State of New Jersey, have invented a new and Improved Lubricating-Packing, of which the following is a full, clear, and exact description.

The invention relates to automobiles, autotrucks and similar vehicles, having a rear axle housing through which extends the rear or driving axle.

The object of the invention is to provide a new and improved lubricating packing filling the spaces between the rear axles and the rear axle housings intermediate the inner and outer roller bearings, and capable of preventing the lubricant within the gear casing from leaking out through the outer ends of the housings and onto the tires to the detriment thereof. Another object is to retain the grease or other lubricating medium within the differential gear housing, thus preventing waste of such lubricant.

In order to accomplish the desired result, use is made of a packing filling each rear axle housing intermediate the inner and outer roller bearings and in contact with the rear axle, the packing having lubricating qualities and anti-grease absorbing qualities, and being compressible to allow of tightly packing it in position in the housing.

A practical embodiment of the invention is represented in the accompanying drawings forming a part of this specification, in which similar characters of reference indicate corresponding parts in both views.

Figure 1:
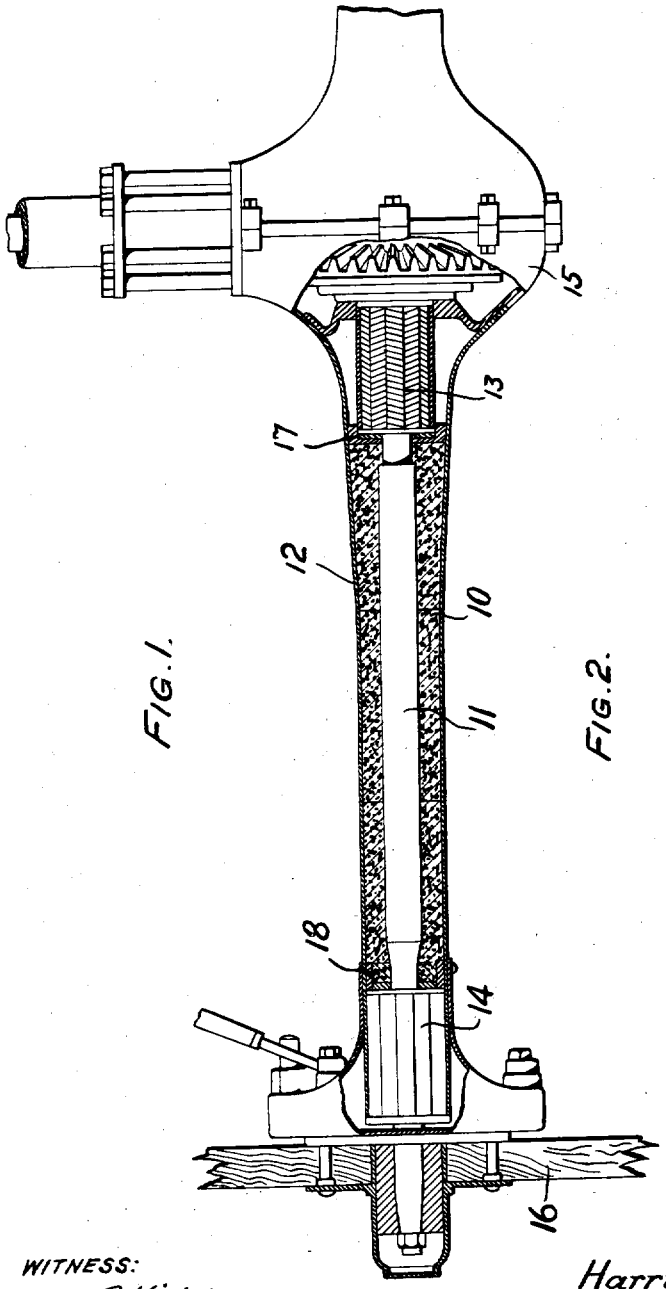
Figure 2:
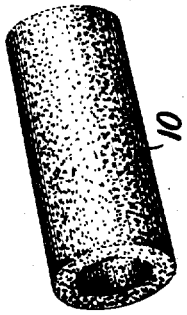

Figure 1 is a sectional plan view of the packing in a position in the housing of a rear axle of a Ford car, part of which is shown in elevation and part in section; and Fig. 2 is a perspective view of the packing.

It is well known that in automobiles of the Ford and other types the lubricant within the differential gear casing gradually works out by way of the left and right rear axle housings and drops onto the tires to the detriment thereof. In order to prevent this lubricant from leaving the gear casing by way of the axle housings, use is made of a packing 10, preferably of cylindrical shape and having lubricating and anti-grease absorbing qualities, at the same time being of a compressible texture to permit of tightly packing the packing around the rear axle 11 within the annular space between the axle 11 and the axle housing 12. By reference to Fig. 1, it will be noticed that the packing 10 extends from the inner roller bearing 13 to the outer roller bearing 14, and as the said packing completely fills the space between the axle 11 and the axle housing 12 it is evident that the lubricant contained within the gear casing 15 cannot work out by way of the housing 12 and drop onto the tires of the rear wheel 16.

It is understood that although the roller bearings 13 and 14 are provided with the usual felt or similar packing devices 17 and 18 such devices do not prevent the escape of the lubricant from the gear casing 15 by way of the rear axle housing 12, but by filling the space in the axle housing 12 between the roller bearings 13 and 14 the lubricant is prevented from leaking out especially as the packing 10 has anti-grease absorbing qualities and at the same time the packing has lubricating qualities thus insuring an easy running of the rear axle 11 in the packing 10.

In order to apply the packing, the wheel 16 is removed, and then the roller bearing 14 is pulled out together with the washers 18. The packing 10 as applied in tubular form as shown in Fig. 2 is now slipped over the outer end of the axle 11 and pushed inward until it abuts against the washers 17 of the inner roller bearing 13. The packing 10 is made in sections and such sections are slipped one after the other onto the axle 11 and pushed inward and pressed to cause the packing to flow and spread to completely fill the housing 12, after which the roller bearing 14 is replaced and likewise the wheel 16.

It is understood that the packing 10 is of such length that two or three sections are sufficient to completely fill the axle housing 12, as indicated in Fig. 1.

While, on account of ease of packing and shipping, as well as of application, it is preferred to make the packing in short tubular sections, as shown, this specific form of packing is not essential, so long as it is so applied to be compressible to completely fill the space between the axle and the housing, and except where specifically claimed, I do not wish to be limited to the preferred form disclosed.

The lubricating packing is principally composed of about 70% tallow, 25% fixed oil and 5% animal fats, and these ingredients owing to their fatty nature do not absorb the lubricant in the gear casing and hence the lubricant is retained in the gear casing.

The advantages of my invention result from the provision of a packing between the axle and the axle housing, which is pressed in position and flowed by said pressure to spread the packing to completely fill the space in the axle housing around the axle and between the roller bearings or the washers abutting the roller bearings, whereby oil is prevented from passing from the gear casing along the axle or along the inner face of the housing.

Having now fully described my invention, what I desire to claim and protect by Letters Patent is:—

1. In a vehicle having a driving axle, a housing through which extends the driving axle, and a bearing at each end of said driving axle, a tubular packing filling the annular space between the axle and the housing, said packing being made in short sections and pliable to permit of tightly packing it in said annular space so as to completely fill said space from one bearing to the other, said packing having lubricating qualities to lubricate the axle and being of a fatty nature so as to resist the flow of a lubricating medium.

2. An automobile having a gear casing and an axle housing extending therefrom, an axle in said housing, a gear wheel on one end of the axle within the gear casing, roller bearings between the axle and the housing adjacent to the gear wheel, and a plastic packing having lubricating qualities between the axle and the housing beyond the roller bearings, the cross-sections of the packing conforming to the cross-section of the space between the axle and the housing on any line through the packing, whereby oil is prevented from passing from the gear casing through the housing.

3. An automobile having a gear casing and an axle housing extending therefrom, an axle in said housing, a gear wheel on one end of the axle within the gear casing, roller bearings between the axle and the housing near each end thereof, and a plastic packing having lubricating qualities between the axle and the housing and between the roller bearings, the cross-sections of the packing conforming to the cross-section of the space between the axle and the housing on any line through the packing, whereby oil is prevented from passing from the gear casing through the housing.

In testimony of which invention I have hereunto set my hand, at New York city, on this 7th day of December, 1920.

HARRY A. LACERDA.